SERIAL MEMORY

Filed July 1, 1954 3 Sheets-Sheet 1

INVENTORS
WILLIAM R. AYRES &
JOEL N. SMITH
BY Morris Lobkin
ATTORNEY

SERIAL MEMORY

Filed July 1, 1954 3 Sheets-Sheet 2

INVENTORS
WILLIAM R. AYRES &
JOEL N. SMITH
BY Morris Rabkin
ATTORNEY

INVENTORS
WILLIAM R. AYRES &
JOEL N. SMITH
BY Morris A. Rabkin
ATTORNEY

United States Patent Office 2,911,622

Patented Nov. 3, 1959

2,911,622

SERIAL MEMORY

William R. Ayres, Wichita, Kans., and Joel N. Smith, Westmont, N.J., assignors to Radio Corporation of America, a corporation of Delaware Application July 1, 1954, Serial No. 440,645

32 Claims. (Cl. 340—174)

This invention relates to serial memory systems of the type used in information handling machines.

This invention is of general utility in information handling machines. In addition, it has a special utility in information handling systems employing a variable word and message length. Variable word length is the characteristic of common language and information. In many information handling machines, fixed word lengths and message lengths are prescribed in order that apparatus units of predetermined capacity can handle iniformly all of the information that is supplied.

In a variable word length information handling system, initial adjustment of the information into prescribed lengths is generally not necessary. However, the apparatus for handling the variable word length generally must be capable of performing more complex operations than apparatus for fixed word lengths.

A static serial memory is one form of apparatus frequently used in information handling machines. Examples of a static serial memory are a static magnetic delay line of the type described in an article by An Wang, Proc. of the I.R.E., April 1951, at page 401; and a stepping or shift register employing trigger circuits such as described in U.S. Patent No. 2,601,089. In memories of this type, each stage of the memory stores, in a relatively static form, a unit of information such as a binary digit one or zero. The term "static" signifies that an external impetus is required to remove the information from its stored condition. The stages of the memory are connected together serially. The information to be stored in the form of signals is read into the first stage serially at one end of the memory and stepped or shifted along to succeeding stages. After the first binary digit is read into the first memory stage, that binary digit is shifted into the second stage by the application of an advance signal. The first memory stage is then empty and able to receive the second binary digit. The first and second digits are then shifted into the third and second memory stages respectively by an advance signal simultaneously applied to all stages. This process may be repeated until all of the stages hold binary digits and the memory is filled to its capacity. Information may be read out of the last stage of the memory in the same order that it was read in. The read-out operation is performed by applying a train of advance signals to the memory to shift the information along to succeeding stages. At the same time, the information signals are monitored as they are shifted out of the last stage.

Where a fixed word and message length is employed, the capacity of a static serial memory may be set to correspond to the word or message length. Consequently, each word or message that is read in fills the memory from the first to the last stages. Therefore, when it is desired to read out from the memory, the stored information is shifted out of the last stage starting with the first advance signal, and any desired operation may be synchronized to start at that time.

However, if a variable word and message length system is employed, the capacity of the serial memory is generally larger than the word or message lengths. Consequently, the memory is not ordinarily filled up to the last stage by the signals that are read in. Therefore, when the memory is read out, the first signals to be shifted out of the last stage may be blank information or information elements left over in the memory from a previous word that was stored. As a result, operations to be performed on the information cannot be synchronized to start with the first advance signal applied to the memory. Furthermore, it will not be readily possible to distinguish the desired word from the information that first comes out of the memory. The problem is further complicated if variable length words from a plurality of memories are to be operated upon simultaneously; for example, if they are to be compared. In order for such operations to be performed readily, it is desirable that the words start appearing from the memories at the same time.

For these reasons, a system is provided, in accordance with this invention, wherein the variable length words are read in and stepped along in the memory so that the first digit may be finally stored in the last stage. Consequently, when the memories are read out, the first digits are available immediately and at the same time. It is also desirable to be able to tabulate variable length words in corresponding portions of a plurality of memories. With such a system corresponding words may be read out at the same time, and desired operations on these words may be readily synchronized.

Accordingly, the following are among the objects of this invention:

One object is to provide a novel system for storing variable length information in a static serial memory.

Another object is to provide a new and improved system for automatically controlling the entry of information to be stored in a static serial memory.

Another object is to provide a new and improved system for automatically controlling the removal of stored information from a static serial memory.

Another object is to provide a new automatic shift for a static serial memory whereby information may be reliably and accurately shifted to successive memory stages as the information is read in.

Another object is to provide a novel and simple system for reliably storing variable length information at a predetermined location in a static serial memory.

In accordance with this invention an advance pulse generator applies an advance pulse to the static serial memory each time the stored information is to be shifted to succeeding memory stages. Means is provided for detecting the reading in of a signal into the memory and for producing an actuating signal when the read-in occurs. The advance pulse generator responds to the actuating signal and produces an advance pulse, or combination of pulses in proper timed relation, to shift the information in the memory. A gated oscillator is also provided for supplying actuating signals to the advance pulse generator. The oscillator is gated on when the last signal to be stored is read into the memory. A train of advance pulses is generated in response to the oscillator signals which continue the stepping of information along the memory. A pulse counter is employed for counting the advance pulses that are applied to the memory. When the advance pulse count corresponds to the capacity of the memory, or of a subdivision thereof, the oscillator is gated off by a signal from the counter. The advance pulses terminate, and the first digit of information is stored in the last memory (or subdivision) stage. Accordingly, the information may then be read out of the memory, in a predetermined time relationship. The read out may be performed by gating on the oscillator. The counter automatically gates off the oscillator when the memory or a subdivision thereof is emptied. The operation of recognizing the last signal to be stored and gating on the oscillator may be performed by one or more code recognition gates which produce a gating signal upon the passage to the memory input of special signal combinations that designate the last signal to be stored. Alternatively, if series of known numbers of signals are to be stored, signal counters may be employed to gate on the oscillator.

In handling large masses of raw information, it is a practice to encode the information and store it compactly on magnetic or perforated tape. The information is then in a state which a machine can handle for processing. One operation of information processing is that of sorting or arranging the information in some predetermined order. The "strings-of-two" method of sorting is one way in which encoded information may be arranged in a desired sequence.

In the "strings-of-two" method, the information is evenly divided onto two input tapes. Two units of information are then selected, one from each of the two input tapes, and compared one with the other. If it is desired to sort the units of information into an ascending sequence, the smaller unit is transferred to one of two output tapes. The larger of the two units is then transferred to the same output tape following the smaller unit. The second two units of information are then selected, one from each of the input tapes and compared one with the other. The smaller of the latter two units is then transferred to the second output tape and is followed in turn by the larger unit. The procedure of selecting, comparing and transferring the units of information continues until all of the units of information encoded on the input tapes have been rearranged in sequential groups of two on the output tapes. A complete rearrangement of the information units from the input tapes is termed a "pass."

On the second pass, the output tapes become the input tapes, and two new output tapes are provided; the same procedure is followed except that each sequential group on an output tape is composed of four units of information arranged in sequence. The smaller unit of the first comparison is transferred to the output tape, and the larger unit is then compared with the next unit from the other input tape. In this way, two units from each input tape are arranged as a sequence of four on an output tape. This procedure is continued in subsequent operations except that each time the output tapes become the input tapes the number of units of information on the new output tapes is increased by a power of two, until finally all the units of information appear in one sequential group on a single output tape.

An apparatus for sorting by "strings-of-two" is described in the copending application of H. P. Guerber, Serial No. 427,167, filed May 3, 1954. Another apparatus for sorting by "strings-of-two" and for performing other sorting operations is described in the copending application of Ayres and Smith, entitled "Information Handling System," Serial No. 440,646, filed July 1, 1954. The present invention is directed to a circulating serial memory system that may be used in the sorting apparatus described in the aforementioned Ayres and Smith application, Serial No. 440,646. Desirable characteristics of such a circulating memory system are economy of equipment, reliability, and rapid operation.

Accordingly, the following are other objects of this invention:

Another object is to provide a new and improved circulating serial memory system.

Another object is to provide a new and improved circulating memory system that may be used for performing sorting operations.

Another object is to provide an improved circulating memory system that may be used for performing sorting operations and that is reliable, rapid in operation and economical in construction.

In accordance with one feature of this invention, a recirculating memory having special utility for sorting includes a gate between the output and input of the memory for recirculating information already stored in the memory. Input means supplies new information to the memory input. A common output means is coupled to the memory input to monitor both the new and the recirculated information. Control means is provided to close the recirculation gate and activate the input means when new information is to be entered in the memory and to open the recirculation gate and deactivate the input means when information is to be recirculated.

A serial memory system for performing sorting operations may include two recirculating memories. A comparator is connected to receive the signals applied to the inputs of both memories. The comparator produces signals in accordance with the results of the comparison. Control means common to both memories controls the recirculation gates and input means of both memories in response to the comparison signals. The control means is arranged to open and close the recirculation gates and to condition both input means so that information is recirculated in one memory while new information is entered in the other. Thus, a comparison that may be performed is between a new item of information and a recirculated item that was previously compared.

The foregoing and other objects, the advantages and novel features of this invention, as well as the invention itself both as to its organization and mode of operation, may be best understood when read together with the accompanying drawing, in which like reference numerals refer to like parts, and in which.

Figure 1:
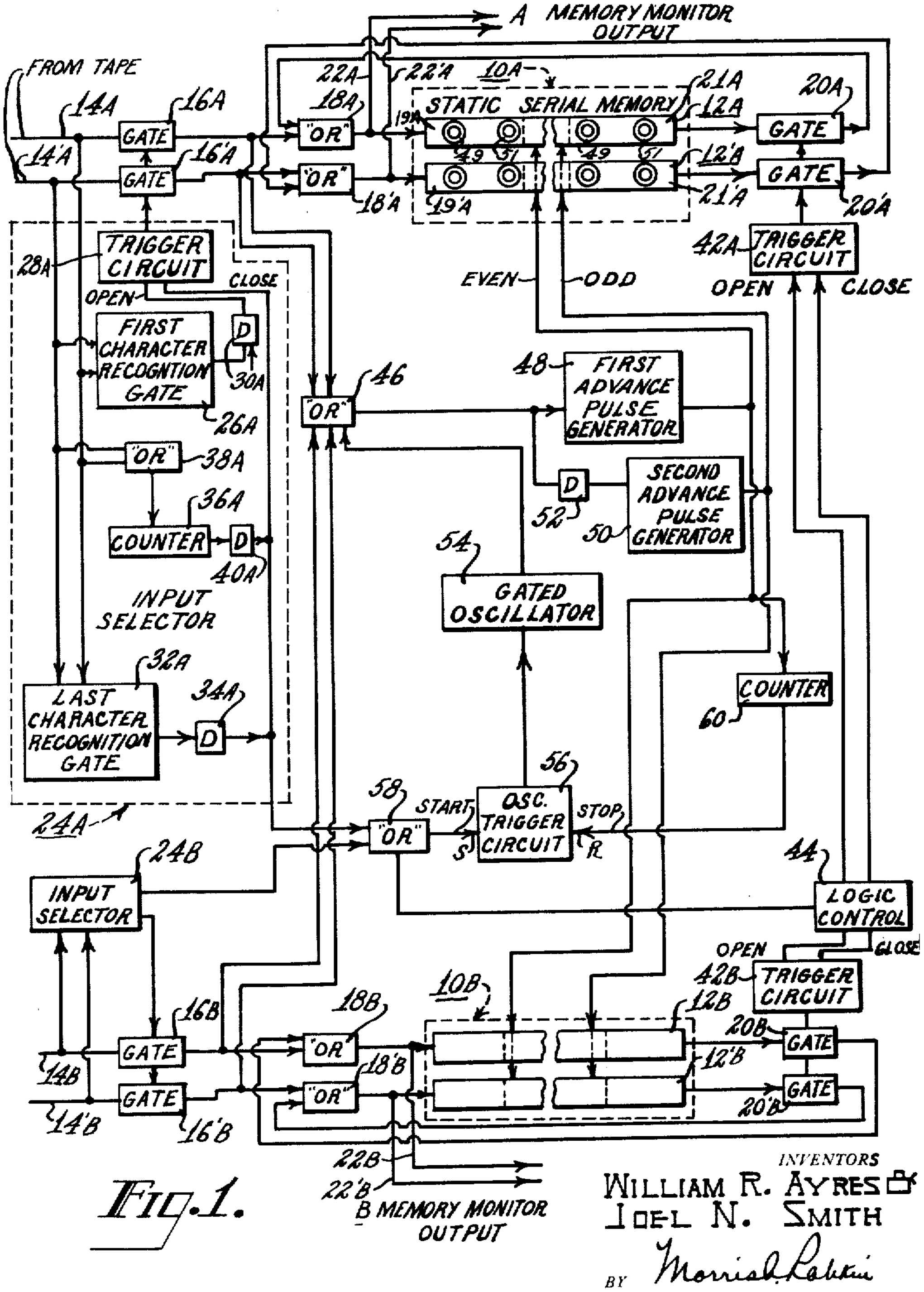
Figure 1 is a schematic block diagram of an embodiment of this invention showing details of an automatic shift for a static serial memory.

Referring to Figure 1, a first static serial memory 10A is shown made up of a plurality of separate static serial registers or memories 12A, 12'A". A second memory 10B and associated input and output apparatus is the same as the first memory 10A. Therefore, only the first memory is described in detail, and corresponding reference numerals with the letter B are used for the second memory 10B. Information to be stored in the registers 12A, 12'A is supplied through separate input channels 14A, 14'A. Each input channel 14A, 14'A includes a separate gate 16A, 16'A which receives the information from a source such as magnetic tape (not shown). The information signals pass from the input gates 16A, 16'A through a separate buffer or "or" circuit 18A, 18'A in each channel and then into the first stage 19A, 19'A of the associated register 12A, 12'A. Each output stage 21A, 21'A of each register 12A, 12'A is connected respectively to a separate output gate 20A, 20'A which, in turn, is connected back respectively to the input "or" circuit 18A, 18'A of the associated register 12A, 12'A. Separate output channels 22A, 22'A connected to the inputs of the registers 12A, 12'A may be used to monitor the information read into the registers as well as the information read out of the registers that is recirculated back to the register inputs.

The input signals may be in the form of pulses and the absence of pulses representing respectively the binary digits one and zero. The combination of signals that appear simultaneously at corresponding parts of the channels or registers form a character that represents, in coded form, a symbol such as a number or letter. In the code system in which the apparatus is employed, every character is made up of at least one pulse. Accordingly, the absence of a pulse on all of the channels represents the absence of information. Generally, coded characters are made up of five or more digits, so that five or more registers 12A and associated input and output channels 14A, 20A are employed. Only two registers 12A, 12'A are shown for simplicity of illustration.

The input gates 16A, 16'A are controlled by an input selector circuit 24A, which may be of the type described in the co-pending patent application of Joel N. Smith, entitled "Information Selecting Circuit," Serial No. 418,679, filed March 25, 1954, now U.S. Patent No. 2,854,652. The input selector 24A includes a first character recognition gate 26A which receives the input signals from the input channels 14A, 14'A as they are applied to the input gates 16A, 16'A. The first character recognition gate 26A provides an output pulse when a special coded signal combination occurs in the input channels 14A, 14'A, such as a code for "start of message." A character recognition gate is described in the Patent No. 2,648,829 to William R. Ayres and Joel N. Smith. Upon the occurence of such a coded character in the input channels 14A, 14'A, the pulse from the first character recognition gate 26A is applied to a trigger circuit 28A through a delay circuit 30A. The recognition pulse sets the trigger circuit 28A, and a static potential level is supplied to the input gates 16A, 16'A to open the gates and hold them open to succeeding characters. A last character recognition gate 32A in the input selector 24A also receives the character signals in the input channels 14A, 14'A when they are applied to the input gates 16A, 16'A. Upon the occurrence of a special code character, such as that representing "end of message," a pulse is applied to the trigger circuit 28A through a delay circuit 34A to reset the trigger circuit 28A. The potential at the output of the trigger circuit 28A is such as to close the input gates 16A, 16'A and prevent the passage of input signals therethrough. The input selector 24A may also include a preset pulse counter 36A which is connected through an "or" circuit 38A to the input channels 14A, 14'A. The "or" circuit 38A passes a pulse to the counter 36A if there is a signal pulse on any of the input channels 14A, 14'A. Thus, the pulse count in the counter 36A is the same as the number of characters that pass through the input gates 16A, 16'A. After a predetermined pulse count, the counter 36A applies a reset pulse to the trigger circuit 28A through a delay circuit 40A to close the input gates 16A, 16'A. The memory output gates 20A, 20'A operate in a manner similar to the input gates 16A, 16'A and are also opened and closed by the different output potentials of a trigger circuit 42A. The output gate trigger circuit 42A is controlled by signals from a central computer or logic control 44.

The signals passed by the input gates 16A, 16'A to the memory registers 12A, 12'A are also applied to another "or" circuit 46. The signal output of this "or" circuit 46 is connected to a first advance pulse generator 48.

This embodiment of the invention is intended for memory registers of the static magnetic delay line type. As described in the article by An Wang, cited above, individual binary digits are stored in magnetic cores 49, 51 in the form of the polarity of the residual magnetism therein. Each stage of a register is made up of two cores, an odd core 49, such as the first core, and an even core 51. A pair of staggered advance pulses is required to shift information one stage in the register. The first advance pulse shifts the information in all the even cores 51 to the corresponding next-stage odd cores 49. The second advance pulse shifts the information from the odd cores 49 to the even cores 51 in the same stage. The first advance pulse generator 48 generates the even-core advance pulse in response to an actuating pulse from the "or" circuit 46. The odd-core advance pulse is generated by a second advance pulse generator 50 which receives the actuating pulse from the "or" circuit 46 through a delay circuit 52. Consequently, when an input signal character is being applied to the odd cores 49 of the first stages 19A, 19'A of the registers 12A, 12'A, an even-core advance pulse is generated and simultaneously applied to all of the even cores 51 of all the registers 12A, 12'A. After the information is entered in the odd cores 49, an odd-core advance pulse is generated and applied simultaneously to all of the odd cores 49 of all the registers 12A, 12'A. Consequently, there is a synchronous shifting of information along the stages of all the registers.

A gated oscillator 54 is also connected to the advance pulse generators 48, 50 through the "or" circuit 46. The gated oscillator 54 is gated on and off by a trigger circuit 56, and, when gated on, provides a train of actuating pulses that are applied to the pulse generators 48, 50. The set input terminal S of the oscillator trigger circuit 56 is connected through an "or" circuit 58 to the outputs of the counter 36A (after delay 40A) and the last character recognition gate 32A of the input selector 24A. Another preset counter 60 is connected to the output of the first advance pulse generator 48 and counts the even-core advance pulses. The output of the advance pulse counter 60 is connected to the reset input terminal R of the oscillator trigger circuit 56.

When information is to be entered into the memory 10A the output gates 20A, 20'A are closed by a signal from the logic control 44. The input gates 16A, 16'A are also closed and remain closed until a special character is received and recognized by the first character recognition gate 26A. An "open" pulse from the first recognition gate 26A sets the input gate trigger circuit 28A. The input gates 16A, 16'A are thereby opened to permit the passage of succeeding characters into the memory 10A. When the first character is applied to the memory 10A an actuating signal is also applied through the "or" circuit 46 to the even-core advance pulse generator 48. Consequently, an advance pulse is generated and applied to the even cores 51 to shift any information stored therein into the succeeding-stage odd cores 49. After a predetermined delay, the odd-core advance pulse generator 50 applies a pulse to the odd cores 49 (including the first core), and the information is thereby shifted to the even cores 51. The first character is then located in the second cores 51 of the registers 12A, 12'A. In a similar manner, all of the other input characters selected by the input selector 24A are entered into first register stages 19A, 19'A of the memory 10A and shifted along to successive stages by the advance pulse generators 48, 50. All of the even advance pulses are counted by the advance pulse counter 60.

When the last selected character passes through the input gates 16A, 16'A, as determined by the counter 36A or last character recognition gate 32A in the input selector 24A, a "close" pulse resets the input gate trigger circuit 28A to close the input gates 16A, 16'A. This "close" pulse is also applied to the oscillator trigger circuit 56 as a "start" signal. The oscillator trigger circuit 56 is thereby set, and the gated oscillator 54 is biased on. The gated oscillator 54 then runs freely and produces a train of actuating pulses for the advance pulse generators 48, 50. For each oscillator pulse, a pair of advance pulses are generated to continue the shifting of information along in the memory 10A. When the total number of even-core pulses counted by the advance pulse counter 60 corresponds to the number of stages in the registers 12A, 12'A, the counter 60 applies a stop signal to the oscillator trigger circuit 56 to bias off the oscillator 54. The last odd advance pulse is generated when the gated oscillator 54 is gated off. This last advance pulse shifts the information into the even cores 51. The initial advance pulse of the next series of advance pulses is applied to the even cores 51 and, therefore, immediately starts the reading out of information from the even cores 51 of the last stages 21A, 21'A of the memory 10A.

When information is to be read out of the memory, an "open" pulse is applied to the output gate trigger circuit 42A from the logic control 44. At the same time a "start" signal is applied to the oscillator trigger circuit 56 through the "or" circuit 58 to gate the oscillator 54 on. As a result, advance pulses are generated and applied to the registers 12A, 12'A to step the information along to the last stages 21A, 21'A and out of the registers. The output signals pass through the open output gates 20A, 20'A and are recirculated back through the input "or" circuits 18A, 18'A into the first stages 19A, 19'A of the registers 12A, 12'A. When the information in the memory 10A has been completely recirculated, the advance pulse counter 60 produces a "stop" signal to gate off the oscillator 54. The recirculated information is carried to a utilization device (not shown) through the memory monitor output channels 22A, 22'A.

When it is desired to empty the memory 10A, 10'A without recirculating the information back into the registers, the output gates 20A, 20'A are left closed and a "start" signal is applied to the gated oscillator trigger circuit 56 by the logic control 44. Advance pulses are generated to shift the information out of the memory. Since the signals coming out of the registers cannot pass through the output gates 20A, 20'A, the circulation path is broken, and the memory is empty when the gated oscillator 54 is stopped by the counter 60.

The advance pulse generator system may also be employed for storing the first information digit at intermediate locations in the memory. The setting of the advance pulse counter 60 determines in what stage of the memory the first character digits are finally stored by controlling the number of advancing pulses that are generated.

The advance pulse generator system may be used for a plurality of memories simultaneously. As shown in Figure 1, both memory 10A and memory 10B are shifted by the same advance pulse generators. The connections and operation of memory 10B are the same as those of memory 10A.

With this arrangement, information may be read either into the A or B memories, and both memories are shifted synchronously by the same advance pulses. An application of this arrangement is the comparison and sorting of two sets of information. For example, with the A output gates 20A, 20'A open and the B output gates 20B, 20'B closed, information may be read into the B memory and at the same time monitored on the B memory monitor 22B, 22'B. The information previously stored in the A memory is shifted along and recirculated through the output gates 20A, 20'A and monitored at the A memory output 22A, 22'A. The A and B memory outputs may be connected to comparison and sorting apparatus (not shown) for comparing the A and B characters and sorting the information.

Appropriate forms of gate, "or" and trigger circuits are described in an article entitled "Digital Computer Switching Circuits" by Page, in "Electronics," September 1948, at page 110. The delay circuits and advance pulse generators may be monostable multivibrators. An appropriate form of preset counter is described in an article entitled "Predetermined Counters," by Wild, in "Electronics," March 1947, at page 121.

Figure 2:
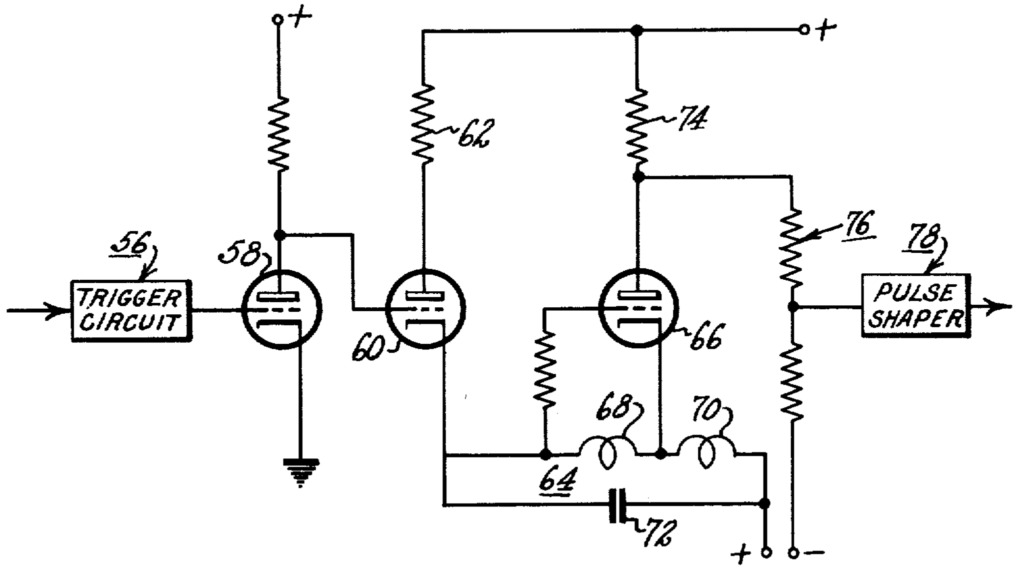
Figure 2 is a schematic circuit diagram of a gated oscillator that may be employed in the embodiment of the invention shown in Figure 1.
Figure 4:
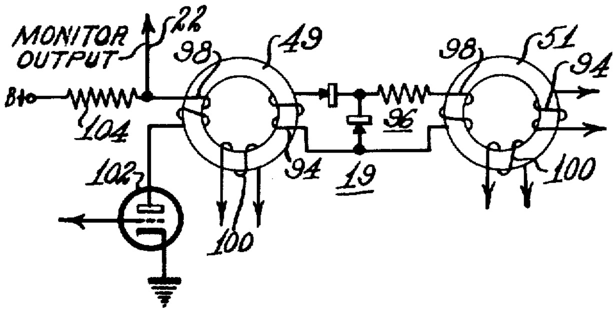
Figure 4 is a schematic circuit diagram of the input stage of a static magnetic serial register embodying this invention.

A gated oscillator circuit that may be employed in the embodiment of Figure 1 is shown in Figure 2. The oscillator trigger circuit 56 is connected at its output to the grid of a triode 58. The anode of the triode 58 is connected to the grid of a ringing oscillator tube 60. Anode current in the ringing oscillator tube 60 is limited by an anode resistor 62. The cathode of the ringing oscillator tube 60 is connected to the resonator 64 of an oscillator 66. The resonator 64 is composed of separate inductors 68, 70 connected in series of a shunt capacitor 72. The cathode of the oscillator tube 66 is connected to the junction of the series inductors 68, 70. Anode current is set in the oscillator 66 by a large anode resistor 74. As a result of the large anode resistor 74, the amplitude of oscillations varies only slightly with tube aging. The output is taken from a voltage divider 76 connected to the anode of the oscillator tube 66. A pulse shaper 78, such as a monostable multivibrator, is used to convert the oscillations to rectangular pulses.

When the trigger circuit 56 is in the normal reset condition, its output potential is low, and the grid of the first triode 58 is below cut-off potential. Due to the cut-off condition of the first triode 58, the grid of the ringing oscillator tube 60 is above cut-off. Low cathode impedance due to conduction in the ringing oscillator tube 60 prevents oscillation of the Hartley circuit 66. When the trigger circuit 56 is set, the first triode 58 is rendered conductive, and the ringing oscillator tube 60 is cut off. The Hartley oscillator 66 then starts to oscillate. When the ringing oscillator 60 is cut off, oscillation of the Hartley oscillator 66 always starts with a negative voltage excursion at the grid of the Hartley tube 66 and a positive excursion at the anode of that tube 66. With appropriate choice of magnitudes of the anode resistors 62, 74 the amplitude of the first cycle of oscillation may be made as large as that of succeeding oscillations. In this way, reliable actuation of the advance pulse generators 48, 50 is ensured.

Figure 3:
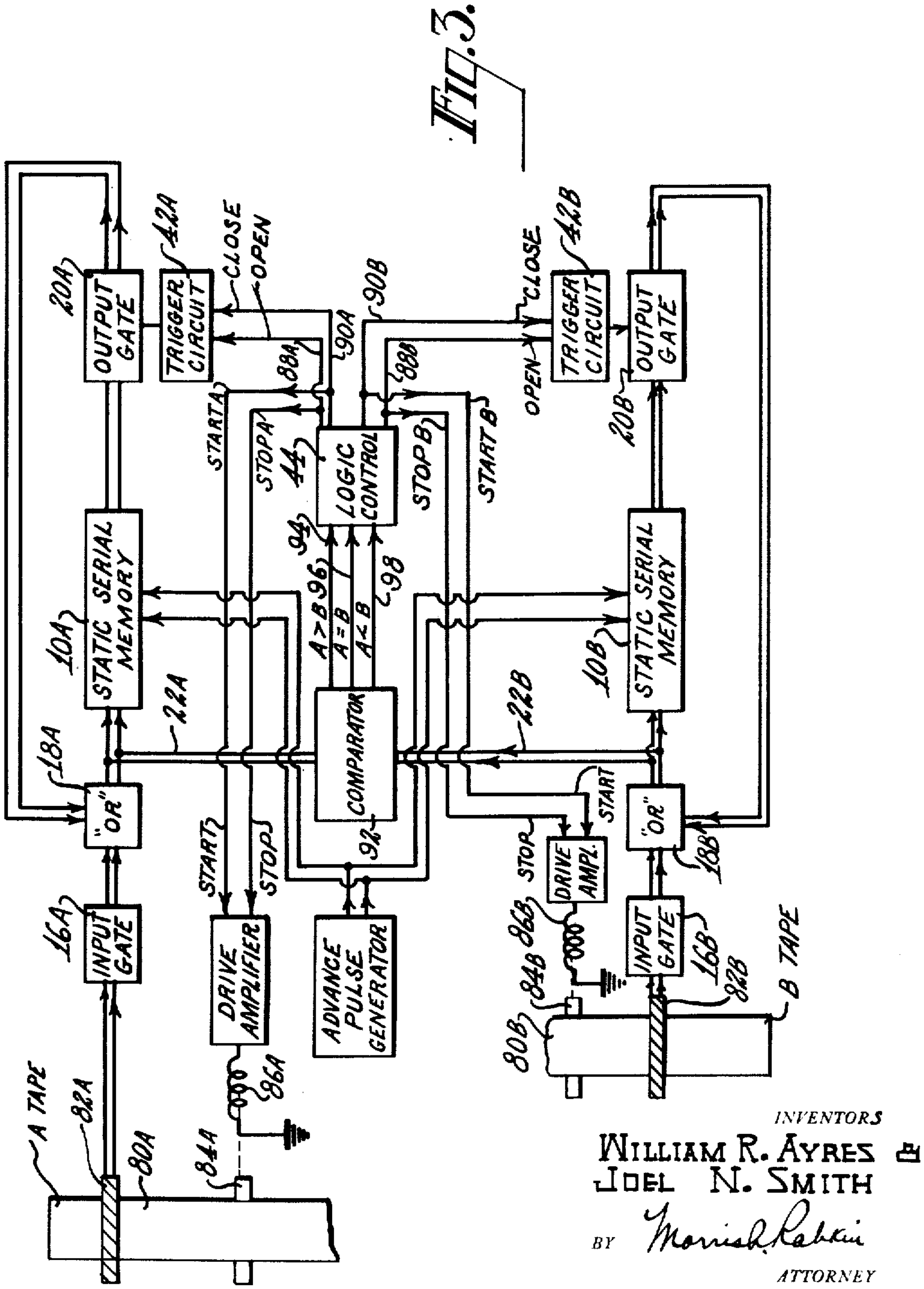
Figure 3 is a schematic block diagram of an embodiment of this invention in an application for sorting information.

Referring to Figure 3, a serial memory system is shown that may be used for sorting information in the system described in the aforementioned copending application of Ayres and Smith, "Information Handling System," Serial No. 440,646. Two static serial memories 10A and 10B are connected as described above with respect to Figure 1. The output gates 20A and 20B are used for recirculation of information, and the input gates 16A and 16B receive the new information to be entered in the memories 10A, 10B. The input gates 16A, 16B receive new information from sources of information which are shown as magnetic tapes 80A, 80B. The information is read from each tape 80A, 80B by a separate reading head 82A, 82B and applied to the associated input gate 16A, 16B if desired through an amplifier (not shown). Each magnetic tape 80A, 80B is individually and intermittently operated by a tape drive actuating mechanism 84A, 84B controlled by a solenoid 86A, 86B. The tape drive actuating mechanism 84A, 84B may be of the type described in the copending application Serial No. 248,767, filed September 28, 1951, now U.S. Patent 2,750,961.

The logic control 44 has four output leads 88A, 90A, 88B, 90B. The first and second logic control outputs 88A and 90A respectively open and close the recirculation gate 20A of the memory 10A as described above. In addition, the first and second logic control outputs 88A, 90A apply stop and start signals respectively to a drive amplifier 92A which controls the energization of the A tape actuating solenoid 86A. Similarly, the third and fourth logic control outputs 88B, 90B respectively open and close the recirculation gate 20B and start and stop the B tape actuating mechanism 84B. Common memory monitor outputs 22A, 22B at the inputs of the static serial memories 10A, 10B are connected to the inputs of a comparator 92. The comparator has 3 outputs 94, 96, 98 which are connected to the input of the logic control 44. An appropriate form of comparator that may be used is described in the copending patent application by Ayres and Smith entitled "Message Comparator," Serial No. 394,693, filed November 27, 1953. The 3 comparator outputs 94, 96, 98 carry signals respectively indicating the three possible comparison results of A greater than B, A equal to B, and A less than B.

The logic control 44 and various sorting operations that may be performed with the serial memory system shown in Figure 3 are described in the aforementioned patent application by Ayres and Smith, "Information Handling System," Serial No. 440,646. For purpose of illustration only, one type of comparison operation used in the sorting is now described. Consider the situation with an A mesage stored in the A memory 10A, a B message stored in a B memory 10B, and a new message to be entered in the A memory. The logic control 44 produces a signal on the second output 90A to close the recirculation gate 20A and to start the tape drive actuating mechanism 84. At substantially the same time, a signal is applied to the third logic control output 88B to open the recirculation gate 20B and stop the actuating mechanism 84B for the B tape. With the A tape 80A being driven, information is read off by the reading heads 82A and applied to the input of the A memory 10A through the input gate 16A under the control of the input selector 24A (Figure 1).

The advance pulse generators 48, 50 of Figure 1 are actuated in the manner described above to apply advance pulses to both memories 10A and 10B of Figure 3. Thus, at the same time that information is being entered and shifted along in the A memory, the information already stored in memory 10B is being recirculated. The first character to be entered in memory 10A is applied to the input stage 19A of memory 10A at the same time that the first character is read out of memory 10B and recirculated back to the input of memory 10B. Thus, the signals which appear simultaneously on the outputs 22A and 22B and applied to the comparator 92 are the first character of the recirculated B message and the first character of the new A message. In a similar manner, all the other corresponding characters of the recirculated B message and the new A message are applied to the comparator 92 at the same time. The comparator 92 produces a signal on one of its output leads 94, 96, 98 in accordance with the result of the comparison. The logic control 44 in response to the comparison signal, or in accordance with other predetermined operations which are programed into it, applies a signal to the open output lead 88 for one of the memories and the close output lead 90 for the other. Thus, the information in one memory is recirculated, and new information is entered in the other memory.

For example, in a "strings-of-two" sorting operation described above the following situation may occur: It is desired to sort units of information into an ascending sequence, and the second or a succeeding pass is being performed. The result of a comparison just described is that A is greater than B. The A message becomes a criterion for a succeeding comparison since it is the greater one of a preceding comparison and an ascending sequence is desired. In that case, the logic control 44 closes the B recirculation gate 20B and starts the B tape 80B to read in a new B message. At the same time, the A recirculation gate 20A is opened and the A tape 80A is held stopped. The new B message and the recirculated A message are then compared. This procedure is repeated as many times as required. Each comparison is properly related to the preceding comparison through the message that is recirculated. Thus, a series of comparisons are related, one to the next, permitting the ordering and sorting of units of information. This operation is achieved by means of the serial memory system of this invention which provides for the simultaneous entry of a new unit of information and the recirculation of a previously compared information unit. In the copending patent application by L. C. Hobbs, entitled "Information Handling System," Serial No. 440,692, filed July 1, 1954, a serial memory system is described that may be used for more complex comparison and sorting operations.

It is apparent from the above description of this invention that a novel and simple system is provided for reliably and accurately shifting a static serial memory. The system may be used for sorting variable length words and messages at predetermined locations in the memory. Furthermore, a plurality of separate registers or memories may be shifted synchronously and automatically by a single advance pulse generator system. A new and improved circulating memory system is provided that is simple and economical in construction. The circulating memory system may be employed for the rapid performance of sorting operations.

What is claimed is:

1. In combination with a static serial memory having a predetermined capacity and in which signals to be stored are advanced to successive memory locations in response to advance signals, an automatic shift therefor comprising input means for applying signals to be stored to said memory, an oscillator, means responsive both to said signals to be stored and to oscillations of said oscillator for generating advance signals and for applying said advance signals to said memory to advance said signals to be stored to successive memory locations, said advance signal generating means being responsive to a stopping signal for terminating the generation of said advance signals, and counting means responsive to a predetermined number of said generated advance signals corresponding to said predetermined capacity for applying such a stopping signal to said advance signal generating means.

2. The combination as recited in claim 2, wherein said memory includes a plurality of separate storage registers, said input means includes a plurality of separate channels each connected to a different one of said registers for simultaneously applying thereto said signals to be stored, and said advance signal generating means is coupled to each of said registers for simultaneously applying said advance signals thereto.

3. An automatic shift for a static serial memory having a predetermined capacity comprising input means for applying signals to be stored to said memory, responsive both to said signals to be stored and to signals from said oscillator means for generating advance signals, means responsive to said signals to be stored for starting said oscillator, and means responsive to a predetermined number of said advance signals for stopping said oscillator.

4. An automatic shift for a static serial memory comprising input means for applying signals to be stored to said memory, means coupled to said input means and responsive to said signals to be stored for generating advance signals, said advance signal generating means including an oscillator, means responsive to said signals to be stored for starting said oscillator, and an advance pulse generator responsive both to oscillations of said oscillator and to said signals to be stored, and counting means responsive to a predetermined number of said advance signals for stopping said oscillator.

5. In combination with a static serial memory having a predetermined capacity, an automatic shift therefor comprising input means for applying signals to be stored to said memory, means for generating advance signals for said memory, an "or" circuit, means responsive to said signals to be stored for applying actuating signals to said advance signal generating means through said "or" circuit, an oscillator for applying signals to said advance signal generating means through said "or" circuit, means responsive to said signals to be stored for starting said oscillator, and counting means responsive to a predetermined number of said advance signals corresponding to said predetermined capacity for stopping said oscillator.

6. The combination as recited in claim 5, wherein said memory includes a plurality of separate storage registers, said input means includes a plurality of separate channels each connected to a different one of said registers for simultaneously applying thereto said signals to be stored, and said advance signal generating means is coupled to each of said registers for simultaneously applying advance signals thereto.

7. An automatic shift for a static serial memory as recited in claim 6 wherein said means for starting said oscillator includes means responsive only to a predetermined combination of signals occurring simultaneously on said input channels for producing a start signal.

8. An automatic shift for a static serial memory as recited in claim 7, wherein each of said input channels includes a separate gate circuit, said means responsive only to a predetermined combination of signals occurring simultaneously on said input channels being coupled to each of said gate circuits for applying a gate-closing signal thereto.

9. An automatic shift for a static serial memory as recited in claim 6, wherein said means for starting said oscillator includes a signal counter that produces a starting signal at a predetermined count, and means for applying a signal to said signal counter upon the occurrence of a signal in any of said input channels.

10. An automatic shift for a static serial memory as recited in claim 9, wherein each of said input channels includes a separate gate circuit, said signal counter being coupled to each of said gate circuits for applying a gate closing signal thereto.

11. In combination with a static serial memory, an automatic shift therefor, said memory including a plurality of separate storage registers, said automatic shift comprising separate input channels for applying signals to be stored to said storage registers, means for generating advance signals, means responsive to the presence of a signal in any of said input channels for applying an actuating signal to said advance signal generating means, an oscillator for applying actuating signals to said advance signal generating means, said advance signal generating means being responsive to and generating at least one advance signal responsive to any of said actuating signals, means responsive to said signals to be stored for applying a starting signal to said oscillator, and counting means responsive to the generation of a predetermined number of said advance signals for applying a stopping signal to said oscillator.

12. An automatic shift in combination with a static serial memory as recited in claim 11, wherein said oscillator includes a trigger circuit, said oscillator being operable to run freely when said trigger circuit is set by said starting signals and being biased off when said trigger circuit is reset by said stopping signals.

13. In combination with a static serial memory, an automatic shift therefor, said memory including a plurality of separate storage registers, said automatic shift comprising separate input channels for applying signals to be stored to said storage registers, means for generating advance signals, means responsive to the presence of a signal in any of said input channels for applying an actuating signal to said advance signal generating means, an oscillator for applying actuating signals to said advance signal generating means, said advance signal generating means being responsive to and generating at least one advance signal responsive to any of said actuating signals, means responsive to said signals to be stored for applying a starting signal to said oscillator, and counting means responsive to the generation of a predetermined number of said advance signals for applying a stepping signal to said oscillator, said oscillator including a trigger circuit, said oscillator being operable to run freely when said trigger circuit is set by said starting signals and being biased off when said trigger circuit is reset by said stepping signals, each of said storage registers including a static magnetic delay line having a plurality of magnetic cores operationally coupled in series and in two groups of alternate cores, said advance signal generating means being operable to generate two advance signals separated by a predetermined time delay responsive to each of said actuating signals, said advance signal generating means including separate means for applying said two advance signals to different ones of said two groups of cores.

14. In combination, a first and a second serial memory each having an input and an output, first and second recirculation gate means respectively coupled between the outputs and inputs of said first and second memories for recirculating information in said memories, first and second input means respectively coupled to said first and second memory inputs for applying new information thereto, and means for controlling said first and second gate means for alternatively recirculating information in one and the other of said memories, said controlling means including means for respectively opening and closing one and the other of said gate means at substantially the same time.

15. In combination, a first and a second static serial memory each having an input and an output, first and second recirculation gates respectively coupled from the outputs of said first and second memories to the inputs thereof for recirculating information in said memories, first and second input means respectively coupled to said first and second memory inputs for applying new information thereto, and means for controlling said first and second input means and said first and second recirculation gates for alternatively recirculating information in one of said memories and entering new information in the other of said memories.

16. The combination as recited in claim 15 wherein said means for controlling said first and second input means and said first and second recirculation gates includes means for respectively opening and closing one and the other of said recirculation gates and for respectively conditioning the associated other and one of said input means to supply and not to supply new information to said other and one memories.

17. The combination as recited in claim 16 wherein each of said input means separately includes information storage means, and an input gate coupled between said storage means and said input of the associated memory, and wherein said means for respectively conditioning the associated other and one of said input means includes means for activating and deactivating said information storage means respectively to read out and to stop read out of information therefrom.

18. In combination, a first and a second serial memory each having an input and an output, first and second recirculation gate means respectively coupled between the outputs and inputs of said first and second memories, first and second input means respectively coupled to said first and second memory inputs for applying new information thereto, means for controlling said first and second gate means for alternatively recirculating information in one and the other of said memories, first and second means for respectively reading out from said first and second memories new information and recirculated information, and means coupled to said first and second read out means for comparing recirculated information in one of said memories with new informtaion in the other of said memories.

19. In combination, a first and a second serial memory each having an input and output, first and second recirculation gate means respectively coupled between the outputs and inputs of said first and second memories for recirculating information in said memories, first and second input means respectively coupled to said first and second memory inputs for applying new information thereto, first and second output means for respectively monitoring said first and second memories to read out new information and recirculated information, means coupled to said first and second output means for comparing new and recirculated information in one and the other of said first and second memories respectively and for producing a signal in accordance with the comparison, and means responsive to said comparison signal for respectively opening and closing one and other of said recirculation gate means.

20. In combination, a first and a second static serial memory each having an input and an output, first and second recirculation gates respectively coupled between the outputs and inputs of said first and second memories for recirculating information in said memories, first and second input means respectively coupled to said first and second memory inputs for applying new information thereto, first and second output means for respectively monitoring said first and second memories to read out new information and recirculated information, means coupled to said first and second output means for comparing new and recirculated information in one and the other of said first and second memories respectively and for producing a signal in accordance with the comparison, and means responsive to said comparison signal for controlling said first and second input means and said first and second recirculation gates for recirculating information in one of said memories and entering new information in the other of said memories.

21. The combination as recited in claim 20 wherein said means for controlling said first and second input means and said first and second recirculation gates includes means for respectively opening and closing one and the other of said recirculating gates and for respectively conditioning the associated input means to supply and not to supply new information to said other and one memories.

22. The combination as recited in claim 21 wherein each of said input means separately includes information storage means, and an input gate coupled between said storage means and said input of the associated memory, and wherein said means for respectively conditioning the associated other and one of said input means includes means for activating and deactivating said information storage means respectively to read out and to stop read out of information therefrom.

23. In combination, a serial memory having an input and an output, recirculation gate means coupled to said memory output, input gate means, means coupling said input gate means and said recirculation gate means to said memory input to insert new information into said memory and to recirculate information already stored, and common output means coupled to said memory input for monitoring signals applied to said memory input from said input and said recirculation gate means.

24. In combination, a static serial memory having an input and an output, a gate coupled to said memory output, a recirculation path coupling said gate to said memory input, an input gate, means coupling said input gate to said memory input, and common output means coupled to said memory input for monitoring signals applied to said memory input from said input and recirculation gates.

25. In combination, a serial memory having an input and an output, an output gate coupled to said memory output, an input gate, means coupling said input gate and said output gate to said memory input, said coupling means including a recirculation path from said output gate to said memory input, and buffer means between said input gate and said output gate, and common output means coupled to said memory input for monitoring signals applied to said memory input from said input and said output gates through said buffer means.

26. In combination, a static serial memory having an input stage and an output stage, an output gate coupled to said output stage, an input gate, means coupling said input gate and said output gate to said input stage to insert new information into said memory and to recirculate information already stored, and common output means coupled to said input stage for monitoring signals applied to said input stage from said input and output gates.

27. The combination as recited in claim 26 wherein said static serial memory includes a static magnetic delay line having an input stage and an output stage, each of said delay line stages include at least one magnetic core and an input winding linked to said core, said common output means being coupled to the input winding of said input stage core to detect signals applied to said input winding.

28. In combination, a serial memory having an input and an output, a recirculation path including an output gate coupled from said memory output to said memory input, input means coupled to said memory input for applying new information signals to said memory input, means for controlling said input means and said output gate for alternative entry of new information into said memory and recirculation of information already stored, said controlling means including means for closing said output gate and conditioning said input means to supply new information to said memory input and alternatively for opening said output gate and conditioning said input means not to supply new information to said memory input, and common output means coupled to said memory input for monitoring signals supplied to said memory input from said input and said output gates.

29. The combination as recited in claim 28 wherein said input means includes information storage means, and an input gate coupled between said storage means and said memory input, and wherein said means for conditioning said input means to supply and not to supply new information includes means for activating and deactivating said information storage means respectively to read out and to stop read out of information therefrom.

30. In combination with a static magnetic shift register having a predetermined capacity and in which signals to be stored are advanced to successive register positions in response to shift signals, an automatic shift therefor comprising input means for applying signals to be stored to said register, an oscillator, means responsive both to said signals to be stored and to oscillations of said oscillator for generating shift signals and for applying said shift signals to said register to shift said signals to be stored to successive register positions, said shift signal generating means being responsive to a stop signal for terminating the generation of said shift signals, and counting means responsive to a predetermined number of said generated shift signals corresponding to said predetermined capacity for applying such a stop signal to said shift signal generating means.

31. In combination with a static magnetic shift register having a predetermined capacity, an automatic shift therefor comprising input means for applying signals to be stored to said register, means for generating shift signals for said register, an "or" circuit, means responsive to said signals to be stored for applying actuating signals to said shift signal generating means through said "or" circuit, an oscillator for applying actuating signals to said shift signal generating means, means responsive to said signals to be stored for starting said oscillator, and counting means responsive to a predetermined number of said shift signals corresponding to said predetermined capacity for stopping said oscillator.

32. In combination, a static magnetic shift register having an input and an output, recirculation gate means coupled to said register output, input gate means, means coupling said input gate means and said recirculation gate means to said register input to insert new information into said register and to recirculate information already stored, and common output means coupled to said register input for monitoring signals applied to said register input from said input gate means and said recirculation gate means.

(References on following page)

References Cited in the file of this patent

UNITED STATES PATENTS

| | | |
|---|---|---|
| 2,074,392 | Herbst | Mar. 23, 1937 |
| 2,276,665 | McDavitt | Mar. 17, 1942 |
| 2,444,421 | Boston | July 6, 1948 |
| 2,623,171 | Woods-Hill | Dec. 23, 1952 |
| 2,672,508 | Lang | Mar. 16, 1954 |
| 2,672,944 | Minton | Mar. 23, 1954 |
| 2,675,538 | Malthaner | Apr. 13, 1954 |
| 2,683,819 | Rey | July 13, 1954 |
| 2,688,740 | Merrill | Sept. 7, 1954 |
| 2,770,797 | Hamilton | Nov. 13, 1956 |
| 2,798,216 | Goldberg | July 2, 1957 |